UNITED STATES PATENT OFFICE.

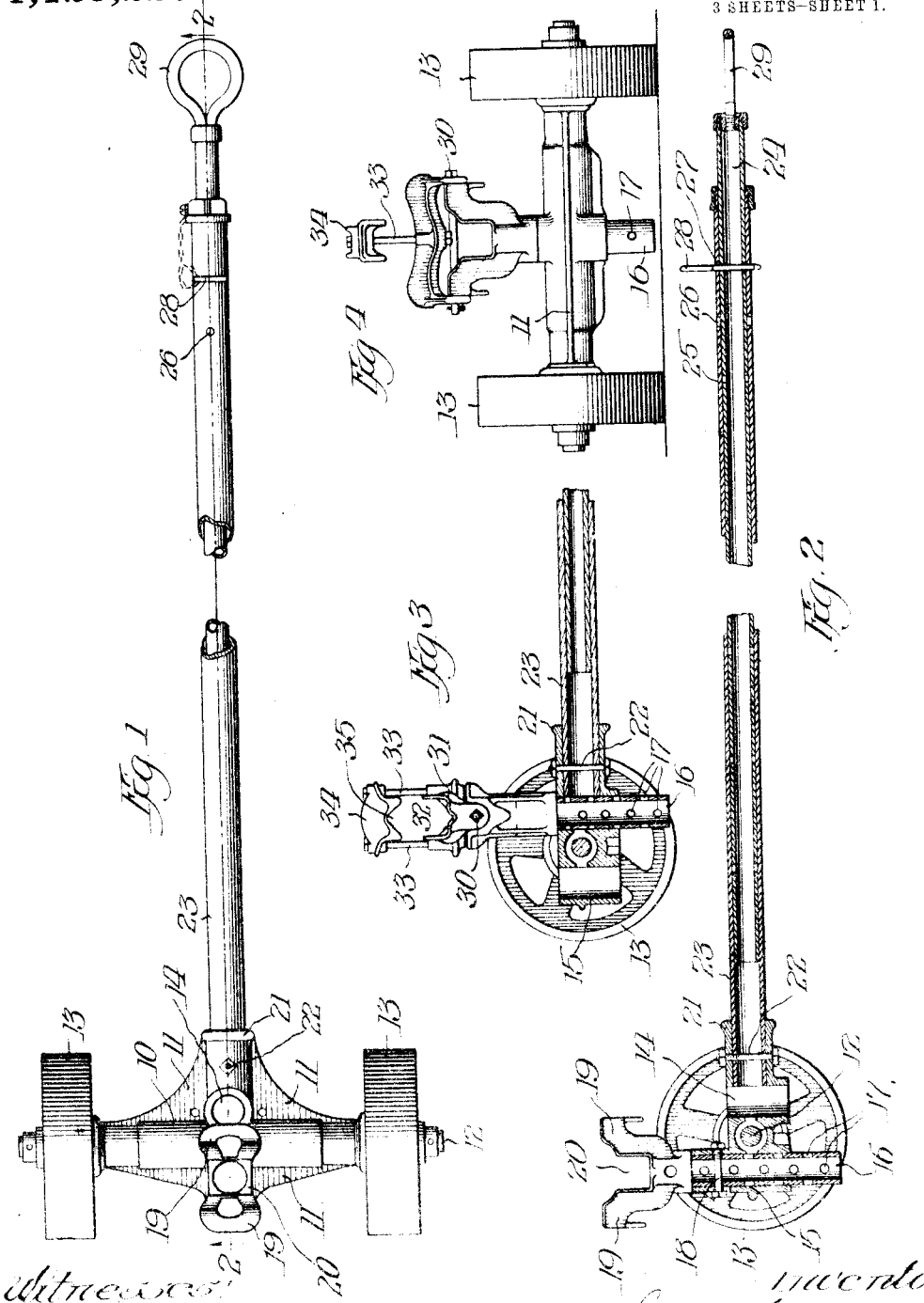

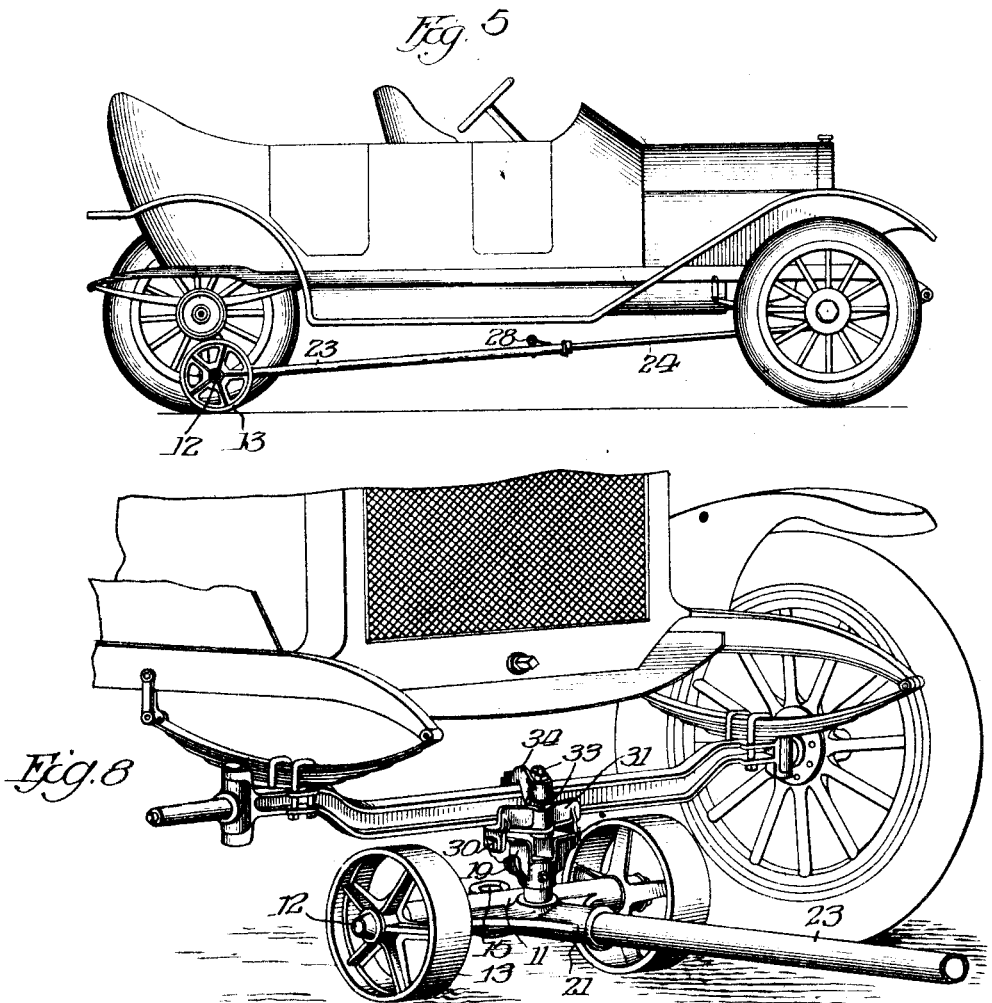

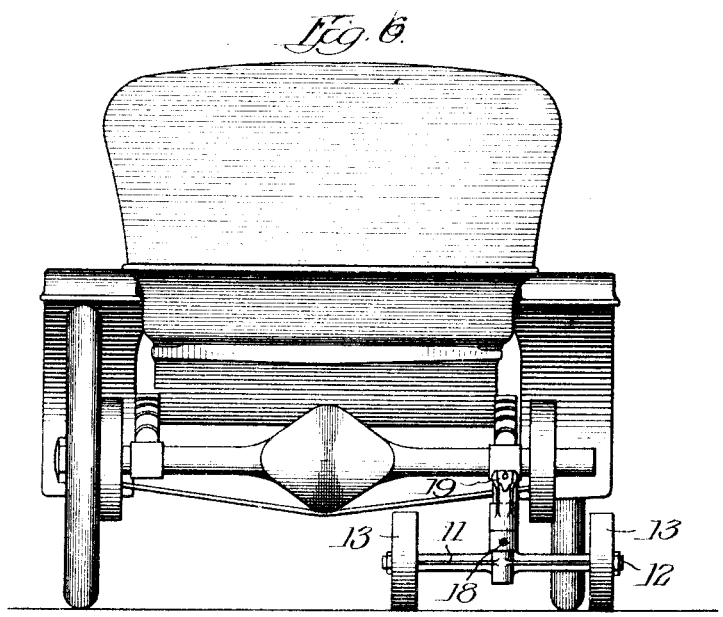
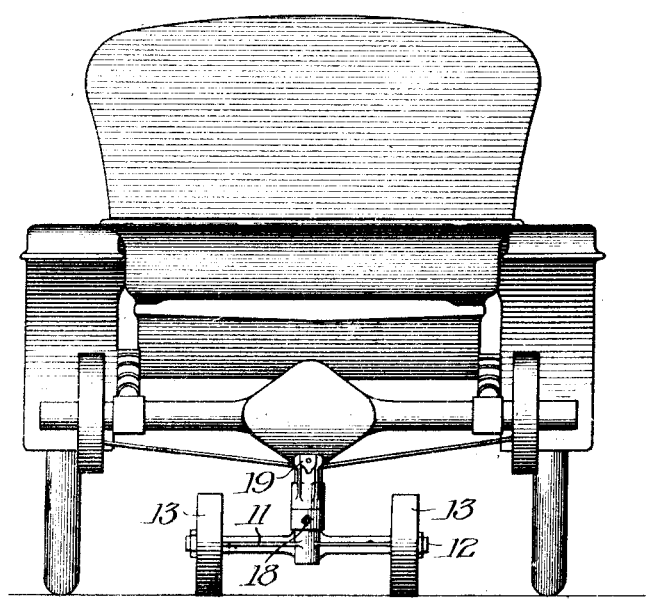

IRA A. WEAVER, OF SPRINGFIELD, ILLINOIS, ASSIGNOR TO THE WEAVER MFG. COMPANY, OF SPRINGFIELD, ILLINOIS, A CORPORATION OF ILLINOIS.

AUTOMOBILE-AMBULANCE.

1,125,227.   Specification of Letters Patent.   Patented Jan. 19, 1915.

Application filed April 11, 1914. Serial No. 831,128.

*To all whom it may concern:*

Be it known that I, IRA A. WEAVER, a citizen of the United States, and resident of Springfield, in the county of Sangamon and State of Illinois, have invented certain new and useful Improvements in Automobile-Ambulances, of which the following is a specification.

My invention relates to devices which may be used to assist the movements of disabled vehicles such as automobiles, and has particular reference to a novel device of this description which shall be adapted for emergency application to either front or rear axles of such vehicles.

It is not an uncommon occurrence for an automobile to become disabled due to the breakage of one of its wheels. In such case it has heretofore been the practice to load the car bodily onto a truck and transport it to the point where repairs may be made, or to jack up the car at the point of the broken wheel and substitute a skid which is suitably lashed to the frame and projects rearwardly therefrom into contact with the ground. Neither of these methods is economical or satisfactory both requiring the expenditure of considerable time and labor. In fact the latter method, that of substituting a skid for the broken wheel, is in most cases only available in case of the breakage of a rear wheel and can not be used if a front wheel is broken.

An object of my invention is to provide a small truck of substantial construction and with a full range of adjustment to adapt it to every contingency.

The device preferably consists in a frame carrying an axle on which a pair of substantial broad-tired wheels are mounted, this frame being provided with apertures, one in front and one to the rear thereof, within which a standard is mounted with capacity for vertical adjustment. This standard is provided at its top with adapters by means of which the device may be quickly secured either to the front or rear axle of practically any automobile at present on the market.

The construction is such that the device may be applied to the center of the rear axle in case both rear wheels are broken or to either end of the axle in case of a breakage of one of the wheels; or the device may be applied to the center or sides of the front axle. Securely connected to the frame is a tubular tongue having a telescoped extension thereof with capacity for longitudinal adjustment. In the case of the breakage of the rear wheel my novel truck is secured to the axle in place of the broken wheel and the tongue extended forward and secured to the front axle or other rigid portion of the car, the adjustable tongue permitting such operation. In cases of this sort the standard referred to is mounted in the aperture to the rear of the axle thus giving the tongue an upward tendency and obviating the possibility of detachment through insecure lashing. In case one of the front wheels is disabled the standard is placed in the aperture in front of the truck axle, thus giving the tongue a downward tendency. In case of insecure lashing the tongue will merely drop to the ground without the possibility of disturbing the connection with the car.

The device will be more readily understood by reference to the accompanying drawings, wherein, Figure 1 is a plan view of a truck constructed in accordance with my invention; Fig. 2 is a longitudinal section on the line 2—2 of Fig. 1, the standard being shown in the rear aperture; Fig. 3 is a similar view with the standard in the front aperture and the standard surmounted by an adapter for engagement with a front axle; Fig. 4 is an end elevation of the construction shown in Fig. 3; Fig. 5 is a side elevation of a car having a rear wheel removed and my ambulance substituted in place of said wheel; Fig. 6 is an end elevation showing the same arrangement; Fig. 7 is an end elevation of a car both rear wheels of which have been disabled, my device being mounted beneath the differential, and Fig. 8 is a perspective view showing the application of my device to a car, one front wheel of which has been disabled.

Referring more particularly to the drawings it will be seen that I provide a frame member or axle and tongue-supporting housing 10, having suitable strengthening webs 11, within which an axle 12, is mounted. On the ends of the axle I locate broad-tired metallic wheels 13, which may preferably be supported on ball or roller bearings. Vertical through apertures 14, 15, are provided in the frame 10, to the front and rear respectively of the axle 12. Within one of these apertures is mounted a tubular standard 16, having transverse openings 17, therein, which openings permit the passage of a bolt 18, through the standard in order to secure adjustment in the vertical height thereof. Surmounting the standard 16, is a casting having divergent arms 19, separated by a space 20, the entrance to which space is flared, as best shown in Fig. 2.

The construction thus far described is adapted for use in connection with the rear axle of a car, as shown in Figs. 5, 6 and 7, the arms 19, engaging the rear axle, the space 20 accommodating the axle truss rod in case such a rod is used.

In view of the many different forms of rear axles, I have not attempted to employ a universal fastening device, preferring to lash the parts together with a rope. In case of application to the rear axle the standard is placed in the aperture 15, as shown in Figs. 1 and 2. Extending forwardly from the frame 10, is a socket 21, within which is secured by means of a bolt 22, a tubular tongue 23. Within this tongue is telescoped an extension 24, having apertures 25 therethrough, which apertures may be registered with an opening 26 or 27, in the tube 23. By means of the pin 28, the telescoped tubes may be held in adjusted longitudinal relation. The tube 24 is provided at its end with a large eye 29, by means of which the tongue may be suitably lashed to the front axle in case of application to the car rear axle or to a towing automobile in case of application to a front axle.

When the device is to be used on a car front axle I mount on the arm 19, by means of a bolt 30, a casting 31, having a recess 32 therein. The arrangement is such, as shown in Fig. 4, that the casting 31, is permitted a slight oscillation on the bolt 30, in order to avoid such rigidity as would result in straining or breaking the parts. Extending vertically through apertures at the sides of the casting 31, are bolts 33, these bolts engaging a clamp member 34, having a notch or recess 35 therein, registering with the recess 32 in the casting 31. Within this space a front axle, which is usually of the I-beam type, may be securely clamped. Thus the car is provided with a flexible, swiveled front truck, by means of the tongue of which the car may be towed without the necessity for steering the towed machine. In case the application is made to a front axle, the standard is placed in the aperture 14, in the frame 10, thus placing the preponderance of weight ahead of the truck axle. The tongue is thus given a downward tendency and in case of a parting of the lashings no damage would result, the tongue merely contacting the ground.

By the use of a device such as herein described, a single man may tow in a crippled car, such work having heretofore required from two to four men.

The device may be constructed of such light weight as to be easily handled by one man.

The construction shown is only typical and many modifications may be made without departing from the spirit of my invention.

I claim:

1. In a device of the class described, the combination of a wheeled truck and a rigid tongue secured thereto, said truck being provided with a recess on each side of its axle, and a vehicle-engaging standard adapted to be seated in one of said recesses, substantially as described.

2. In a device of the class described, the combination of a wheeled truck, a vehicle-engaging standard, and a tongue on said truck, and means on said truck for engaging said standard either in front or in the rear of the truck axle, substantially as described.

3. In a device of the class described, the combination of a wheeled truck, a vehicle-engaging standard, and an extensible tongue rigidly secured to said truck, substantially as described.

4. In a device of the class described, the combination of a wheeled truck, a vehicle support mounted in said truck, a cap superposed on said support and shaped to coöperate with one portion of a vehicle, and an adapter mounted for limited oscillation on said cap, substantially as described.

5. In a device of the class described, the combination of a wheeled truck, a swiveling vehicle support coöperating with said truck, said support being shaped to coöperate with the rear axle of a vehicle, and an adapter superposed on said support and shaped to coöperate with a vehicle front axle, substantially as described.

6. In a device of the class described, the combination of a wheeled truck, a vertical swiveling standard on said truck, and an axle-engaging device, said axle-engaging device being secured to said standard for oscillation on a horizontal pivot, substantially as described.

7. In a device of the class described, the combination of a wheeled truck, a standard mounted on said truck and adapted to swivel thereon, and an axle-engaging device horizontally pivoted to the upper end of said standard and adapted for limited oscillation with relation thereto, substantially as described.

Signed at Springfield, Illinois, this sixth day of April, 1914.

IRA A. WEAVER.

Witnesses:
D. KRANICHFELD,
R. C. BENNETT.